T. HARDEN.
APPARATUS FOR MACHINING PIPE ENDS TO FORM SPIGOT AND SOCKET JOINTS.
APPLICATION FILED NOV. 24, 1909.
980,775.  Patented Jan. 3, 1911.
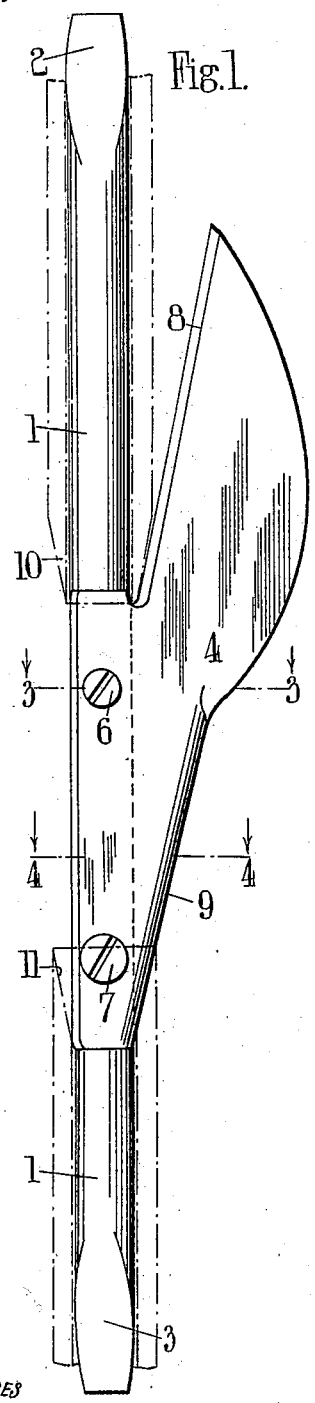
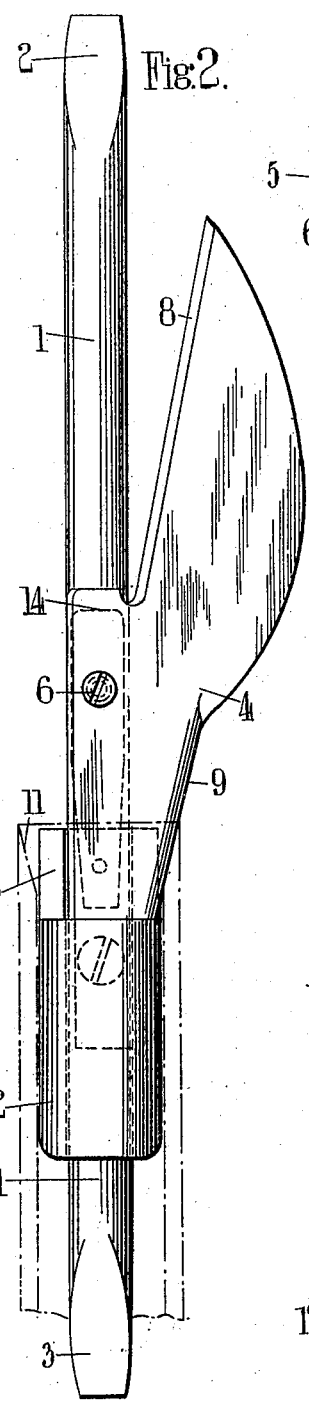
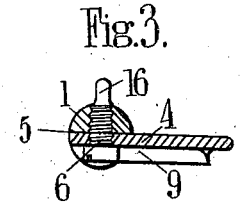
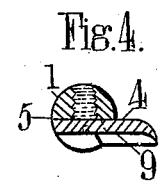
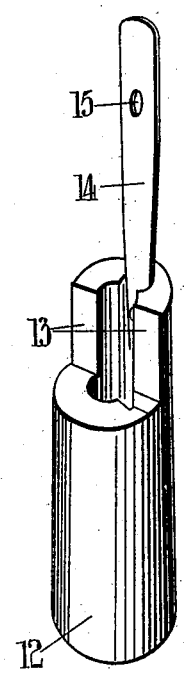
WITNESSES
J. P. Davis
INVENTOR
Thomas Harden
BY
ATTORNEYS

UNITED STATES PATENT OFFICE.

THOMAS HARDEN, OF FULHAM, LONDON, ENGLAND.

APPARATUS FOR MACHINING PIPE ENDS TO FORM SPIGOT AND SOCKET JOINTS.

980,775.     Specification of Letters Patent.     Patented Jan. 3, 1911.

Application filed November 24, 1909. Serial No. 529,718.

*To all whom it may concern:*

Be it known that I, THOMAS HARDEN, a subject of the King of Great Britain, and resident of 62 Hurlingham road, Fulham, in the county of London, England, electrical engineer, have invented certain new and useful Improvements in Apparatus for Machining Pipe Ends to Form Spigot and Socket Joints, of which the following is a specification.

My invention relates to an improved tool for forming conical spigot and socket ends on lead or other tubes and pipes, with the object of enabling such tubes or pipes to be rigidly jointed together by means of solder or otherwise without alteration to the cross-sectional area of the bore. For this purpose it has been proposed to employ a tool in the form of a hollow cone longitudinally slitted and presenting at the respective edges of the slit an internal and an external cutting edge adapted, upon the cone being rotated, to operate the one edge externally and the other internally upon the material of the tube or pipe according as the cone is passed over or inserted within the end to be cut. While this form of tool, in consequence of the employment of a cone whose surface is virtually continuous in the circumferential direction, is to some extent adapted to be self-adjusting for tubes or pipes of all diameters within the limits between which the implement is designed to operate, it has the defect of providing no means for insuring the maintenance of alinement between the axes of the tube and cone. The present invention is designed to obviate this defect by insuring the maintenance of alinement between the axes of the implement and the work, the improved tool being further designed to permit of the relatively expensive cone above referred to being dispensed with.

With these objects in view the tool of my invention consists of a duplex cutter (preferably constituted by a single blade) fixed to a double-ended mandrel and having two parallel cutting edges which are set at the requisite inclination to the axis of the mandrel so as to be adapted, when the latter is inserted in the pipe or tube and rotated, to cause the end of the pipe or tube to be cut away either externally or internally to the proper conical form according as the one or the other edge is employed. The mandrel is of a diameter to fit and rotate easily within the bore of the smallest pipe or tube with which the tool is adapted to work, but the cutting edges of the implement are made sufficiently long to deal with tubes or pipes of different bores and thicknesses, while provision for adapting the mandrel to fit bores larger than the minimum is made by means of bushes which can be slipped over the mandrel and have external diameters corresponding to the internal diameters of the larger tubes or pipes.

In the accompanying drawings Figure 1 is a side elevation showing the preferred form of the tool of my invention, as used for cutting the ends of tubes or pipes of minimum size, and Fig. 2 is a similar view showing the use of the tool with a bush whereby it is enabled to cut the end of a tube of larger size, the pipe or tube being shown in each view in dot-and-dash lines. Figs. 3 and 4 are cross sections on lines 3—3 and 4—4 of Fig. 1 respectively. Fig. 5 is a perspective view of a bush.

1 is the mandrel which is formed of a length of cylindrical metal bar having both of its ends squared as at 2 and 3 respectively or otherwise adapted to be engaged by the chuck or equivalent part of a breast-drill or other hand or power tool whereby the implement may be rotated as required.

4 is the blade of the cutter which is mounted on the mandrel 1 by being applied against a flat 5 (Figs. 3 and 4) formed toward the middle of the length of the mandrel, and fixed by means of screws as at 6 and 7. The blade 4, which projects laterally from the mandrel 1, has two cutting edges 8 and 9 whereof the one 8, for cutting spigots, is directed inward (*i. e.* toward the axis of the mandrel), the blade at this part overhanging its attachment to, and extending alongside the cylindrical portion at the corresponding end of the mandrel 1 as shown, so that when this portion of the mandrel is rotated within the bore while the edge 8 is pressed against the open end of the pipe or tube, the latter will be cut away on its external surface as indicated at 10. The other cutting edge 9 is directed outward and extends alongside the flat 5 on the mandrel, so that when the adjacent cylindrical portion of the mandrel is rotated within the bore while the edge 9 is pressed against the open end of the pipe or tube, the latter will be cut away on its internal surface as indicated at 11.

When the tool is employed to deal with pipes or tubes whose internal diameter exceeds the diameter of the mandrel 1, there is slipped over the latter a cylindrical bush 12 which fits on the cylindrical part of the mandrel and within the bore of the pipe or tube, the bush being preferably adapted to rotate with the tool. For this purpose the bush may be cut away at one side so as to leave a longitudinally extending flat as at 13 adapted to contact with the flat surface of the cutter-blade 4, and the bush may also be provided with a spring tang 14 adapted, when the bush is in position on the mandrel, to lie against the mandrel and to interlock therewith by a hole 15 in the tang taking over the projecting end 16 of (say) the screw 6 already referred to. The bush would of course be changed to suit tubes or pipes of different diameters, any one bush being however adapted for use with either edge 8 or 9 of the cutter indifferently inasmuch as the bush can be slipped over the mandrel from either end and the hole 15 should be so placed as to take over the projection 16 from whichever direction the tang 14 is presented.

In using the tool, that end of the mandrel 1 adjacent to the cutting edge 8 or 9 which it is desired to employ is inserted in the bore and, while the edge (having been lubricated) is pressed against the open end of the pipe or tube, the mandrel is rotated by means of an ordinary breast-stock, detachable handle, or power-driven device.

Claims:

1. A tool for trimming lead pipes consisting of a square-ended mandrel, and a single blade detachably secured to the mandrel, said blade having an inwardly directed cutting edge at one end thereof and an outwardly directed cutting edge at the other end, substantially as set forth.

2. A tool for trimming lead pipes consisting of a mandrel and a blade detachably connected with the mandrel, said blade having a plurality of cutting edges, substantially parallel with each other and both inclined with respect to the direction of length of the mandrel and facing in opposite directions.

3. A tool for trimming lead pipes consisting of a mandrel and a blade connected with the mandrel with its long axis inclined with respect to the direction of length of the mandrel, said blade having a cutting edge at each side of the blade.

THOMAS HARDEN.

Witnesses:
    GEORGE E. MINTERN,
    WILLIAM DAVIES.